UNITED STATES PATENT OFFICE.

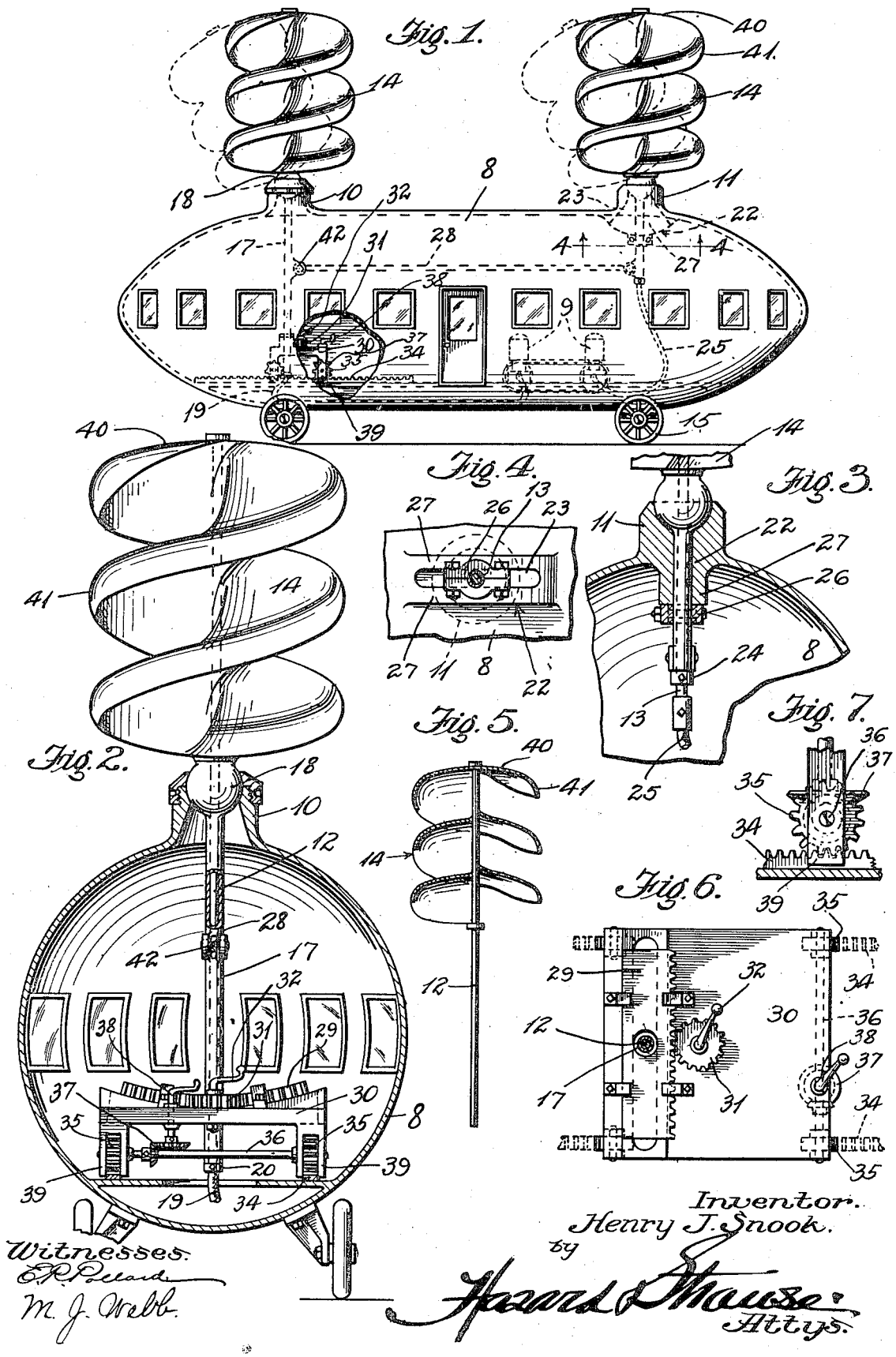

HENRY J. SNOOK, OF SANTA MONICA, CALIFORNIA.

FLYING-MACHINE.

1,069,906.  Specification of Letters Patent.  Patented Aug. 12, 1913.

Application filed June 8, 1912. Serial No. 702,431.

*To all whom it may concern:*

Be it known that I, HENRY J. SNOOK, a citizen of the United States, residing at Santa Monica, in the county of Los Angeles and State of California, have invented a new and useful Flying-Machine, of which the following is a specification.

My invention relates to that class of flying machines which are heavier than air, and an object thereof is to provide simple and easily controlled actuating means for the same.

It is also an object to provide lifting, propelling and steering means all embodied in the same actuating mechanism.

It is also an object to provide safety devices in conjunction with the actuating means.

In the accompanying drawing forming a part of this specification, Figure 1 is a side elevation of the structure showing the preferred form of the body or car. Fig. 2 is an enlarged sectional view on the axial line of the forward shaft. Fig. 3 is a detail section on the axis of the rearwardly placed shaft. Fig. 4 is a section on line 4—4 looking in the direction of the arrows. Fig. 5 is a longitudinal section of the helix. Fig. 6 is a plan view of the controlling mechanism. Fig. 7 is a detail of the track rack and its operating connections.

Heretofore it has been the practice to provide lifting, propelling and supporting mechanism for flying machines formed of independent and distinct devices operating independently and resulting in the consequent multiplicity of parts, and I overcome the objectionable features of such complicated mechanism by combining these elements as described more specifically hereinafter.

In the drawings 8 represents my preferred form of body member consisting of a cylindrical shell or car with tapered ends, providing an inclosure for the motors 9 and the bearings 10—11 of the operating shafts 12 and 13 of the helically formed planes or propellers 14. As is shown the car or body is provided with suitable doors and windows and a supporting floor to carry the motors and the controlling devices, and is also provided with wheels 15 attached to its lower portion to allow movement on the ground and support the car in a proper position when resting upon the earth.

The forward helix 14 is rigidly secured to or formed with a shaft 12 extending through an elongated bearing 17 provided at its point of bearing in the upper casing of the car with a ball and socket joint 18 or other pivotal means to allow a universal movement of the shaft with its bearing 17. The bearing 17 extends downwardly to a point below the controlling station and I have shown the shaft 12 connected by suitable flexible shafting 19 to the source of power 9. The lifting action of the helix is controlled by a sleeve 20 placed at its lower end taking up the thrust on the lower end of the bearing 17.

Placed rearwardly and properly balanced with the forward helix is a coöperating helix mounted rigidly on the shaft 13, inclosed in the pivoted bearing 22, said bearing being mounted in the slot 23 with its opening extending in an axial direction with the car and restricting the movement of this helix to a fore and aft direction. The shaft 13 is also provided with a thrust bearing 24 with flexible shaft connections 25 to the motor. The shaft bearings 22 are also provided with a stop 26 which bears on the curved periphery of the flanges 27 forming the sides of the slot, and secures the bearing and receives the thrust from the helix to the shaft bearing. Connecting the shaft bearings 12 and 13 is a rod 28 pivoted at either end to the respective shafts to control the two helixes in proper coöperative position parallel to the axial plane.

As before stated, shaft bearing 12 extends to the controlling station and is carried in a suitable bearing through the reciprocating rack 29 mounted on the table 30 and placed in operative contact with the pinion 31, provided with a shaft and operating handle 32. I have shown the rack 29 in the form of a segment of an arc described from the center of the pivotal bearing, a movement imparted to the handle 32 will move the shaft in its bearing with the helix in a direction transverse to the axis of the car. To provide for the axial movement the table 30 is mounted on a track consisting of racks 34 engaging pinions 35 mounted on shaft 36 and operated through bevel gears 37 by a handle and shaft 38.

The motion imparted to the handle 38 by an operator reciprocates the table in an axial direction and moves the shaft bearing 13 with its shaft and the helix in an axial direction which movement, as already stated, is also imparted through the rod 28 to the rearwardly placed shaft bearing 13. Pinions 35 also act as wheel supports for the table 30 and are journaled in suitable bearings 39 which are extended below the plane of the racks 34 and hold the table from lateral movement in relation to the track.

Referring more specifically to the helix 14, I form the latter of double planes consisting of a plurality of turns, only three being shown in the drawing to illustrate the general principle. These planes are formed of a substantially flattened surface 40 with a downwardly extending curved lip 41 rigidly formed of such shape that when air impinges upon its lower surface and it acts as a parachute to retard the downward movement and prevent the entire structure from falling should the motive power fail to operate.

In the operation of my invention to start from the ground the helical planes or propellers are started in revolution in the vertical position and the car is lifted clear of the ground without progression in any other than a vertical plane. After attaining the suitable height to clear buildings or other structures, the movement of the shafts in an axial direction will cause the planes to incline and pull in the plane of the axis. When it is desired to progress in a plane or direction varying from this, transverse movement may be imparted by means on the control handle 32 and its operating connections to carry the forward helix out of the axial plane and deflect the car in the direction corresponding to the side toward which the helix is tipped. Sufficient play is permitted in the bearings 42 of the rod 28 to allow for this transverse movement without materially altering the proper relation of the rear helix.

What I claim is:

A flying machine, comprising a body member, motive power mounted therein, a pair of helically formed propellers revolubly supported above said body, shafts secured to said propellers and projecting into said body, ball and socket bearings supporting said propellers and their shafts, rack tracks disposed longitudinally of said body member, a table adapted to travel on said tracks, a transverse rack mounted on said table and provided with an opening adapted to engage one of said shafts, means to limit the movement of the other of said shafts, driving means engaging said shafts connected with said motive power, a connecting rod joining said propeller shafts, whereby the longitudinal movement of said table changes the longitudinal angularity of said propellers, and movement of the transverse rack, the transverse angularity of said engaged shaft.

In witness that I claim the foregoing I have hereunto subscribed my name this 28th day of May, 1912.

H. J. SNOOK.

Witnesses:
 EDMUND A. STRAUSE,
 EARLE R. POLLARD.